(12) United States Patent
Wijekoon et al.

(10) Patent No.: US 9,419,536 B2
(45) Date of Patent: Aug. 16, 2016

(54) DC POWER TRANSMISSION SYSTEMS AND METHOD OF ASSEMBLING THE SAME

(71) Applicant: General Electric Company, Schenectady, NY (US)

(72) Inventors: Piniwan Thiwanka Bandara Wijekoon, Munich (DE); Christof Martin Sihler, Bavaria (DE); Stefan Schroeder, Munich (DE); Jie Shen, Unterföhring (DE); Pierluigi Tenca, Bavaria (DE)

(73) Assignee: General Electric Company, Niskayuna, NY (US)

( * ) Notice: Subject to any disclaimer, the term of this patent is extended or adjusted under 35 U.S.C. 154(b) by 191 days.

(21) Appl. No.: 14/193,525

(22) Filed: Feb. 28, 2014

(65) Prior Publication Data
US 2015/0249402 A1 Sep. 3, 2015

(51) Int. Cl.
*H02M 1/12* (2006.01)
*H02M 7/06* (2006.01)
(Continued)

(52) U.S. Cl.
CPC .. *H02M 7/06* (2013.01); *H02J 3/36* (2013.01); *H02M 1/12* (2013.01); *H02M 1/14* (2013.01); *H02M 5/04* (2013.01); *H02M 7/48* (2013.01); *Y02E 60/60* (2013.01)

(58) Field of Classification Search
CPC .......... H02M 1/12; H02M 1/14; H02M 5/04; H02M 7/48; H02M 7/00; H02M 7/06; H02J 3/36
See application file for complete search history.

(56) References Cited

U.S. PATENT DOCUMENTS 4,057,736 A 11/1977 Jeppson
5,714,821 A * 2/1998 Dittman ................... H02P 9/38
30/180

(Continued)

FOREIGN PATENT DOCUMENTS

CN 203278265 U 11/2013
EP 1876696 A2 1/2008

(Continued)

OTHER PUBLICATIONS

Woodford, "HVDC Transmission", Manitoba HVDC Research Centre, pp. 1-27, Mar. 18, 1998.

(Continued)

*Primary Examiner* — Matthew Nguyen
(74) *Attorney, Agent, or Firm* — Nitin N. Joshi

(57) ABSTRACT

A DC power transmission system is configured to generate an electric field including components substantially constant with respect to time and varying with time. The DC power transmission system includes an AC stage configured to receive AC electrical power. The AC stage includes a transformer including primary windings and secondary windings configured to be electromagnetically coupled to, and electrically isolated from, each other. The AC stage also includes an AC/AC converter having substantially no insulating features against the at least one substantially constant component of the electric field. The AC/AC converter is electrically coupled to the primary windings. The DC power transmission system also includes an AC/DC conversion stage positioned downstream of the AC stage. The AC/DC conversion stage includes an AC/DC rectifier configured to convert AC electrical power to DC electrical power without external control. The AC/DC rectifier is coupled to the secondary windings.

23 Claims, 8 Drawing Sheets

(51) Int. Cl.
*H02J 3/36* (2006.01)
*H02M 1/14* (2006.01)
*H02M 5/04* (2006.01)
*H02M 7/48* (2007.01)

(56) References Cited

U.S. PATENT DOCUMENTS

| | | | |
|---|---|---|---|
| 6,680,856 B2 * | 1/2004 | Schreiber | H01M 5/458 307/82 |
| 7,649,753 B2 * | 1/2010 | Ranstad | H02M 5/4585 363/21.02 |
| 7,851,943 B2 | 12/2010 | Datta et al. | |
| 7,880,419 B2 | 2/2011 | Sihler et al. | |
| 2008/0007973 A1 | 1/2008 | Schreiber | |
| 2011/0141773 A1 | 6/2011 | Larsen et al. | |
| 2012/0212983 A1 | 8/2012 | Schreiber | |
| 2012/0267955 A1 | 10/2012 | Zhan et al. | |
| 2013/0175958 A1 | 7/2013 | McJunkin et al. | |
| 2013/0197704 A1 | 8/2013 | Pan et al. | |

FOREIGN PATENT DOCUMENTS

| | | |
|---|---|---|
| WO | 0169758 A1 | 9/2001 |
| WO | 2011033308 A2 | 3/2011 |

OTHER PUBLICATIONS

Liu, "Long-Distance DC Electrical Power Transmission", Electrical Insulation Magazine, IEEE, vol. No. 29, Issue No. 5, pp. 37-46, Sep.-Oct. 2013.

A European Search Report and Opinion issued in connection with corresponding EP Application No. 15155915.0 on Jun. 29, 2015.

* cited by examiner

DC POWER TRANSMISSION SYSTEMS AND METHOD OF ASSEMBLING THE SAME

BACKGROUND

The field of the disclosure relates generally to systems and methods for transmitting direct current (DC) power to a load, and more specifically to a DC transmission system having a converter with an active alternating current (AC) stage that does not require heavy DC insulation with respect to ground and a passive AC-to-DC conversion stage.

Most land based transmission systems transmit AC power from an electrical power source, such as a generator, to an electrical load, such as a motor. Any conversion to DC power is typically performed as close to the electrical load as possible. AC power transmission systems are more prevalent than DC transmission systems due to the reduced cost and improved efficiency of AC transformers and switch gear. However, AC transmission systems have reactive losses associated with the transmission cables that do not exist in DC transmission systems. Accordingly, DC transmission systems may be more efficient and cost effective when transmitting power over long distances where the reactive losses outweigh the more expensive DC transformer equipment. This is especially true in undersea cables, where the reactive losses are compounded.

High-voltage direct current (HVDC) transmission systems and medium-voltage direct current (MVDC) transmission systems may be utilized to efficiently transmit power over long distances. However, known DC transmission systems have some inefficiencies that cause increased costs for operators. Specifically, known DC transmission systems have an AC/DC rectifier, such as a diode rectifier, that converts a received AC power, such as from the electrical grid, to DC power. The DC power is then modified by active components, e.g., DC/DC converters with active semiconductor-based devices such as insulated gate bipolar transistors (IGBTs) and thyristors. The DC power is also modified with passive components, e.g., capacitors, resistors, diodes, and transformers, to control the DC voltage level of the DC power. However, in known systems, the active components and the passive components must be heavily DC insulated to ground to prevent damage to the components in the event of a DC fault. For example, in typical systems, the active and passive components are insulated to withstand over-voltage conditions equivalent to approximately two times the transmission voltage level that may be in the ranges of tens of kiloVolts (kV) DC to hundreds of kV DC. DC insulation of passive components is relatively inexpensive, but insulation of the active DC/DC converter requires all of the auxiliary power components to be insulated with respect to ground, including gate drives and all sensors. Further, cooling systems and any other auxiliary support equipment for such active DC/DC converters also requires the same level of DC insulation with respect to ground. Accordingly, the size, amount of materials, and cost of the active components with DC insulation to ground can be significant. As some applications of DC power transmission systems have limited free space, for example, oil and gas platforms, current DC power transmission systems may be too large for a single platform, significantly increasing capital investment and operational costs.

BRIEF DESCRIPTION

In one aspect, a direct current (DC) power transmission system is provided. The DC power transmission system is configured to generate an electric field including at least one component substantially constant with respect to time and at least one component that varies with time. The DC power transmission system includes an alternating current (AC) stage configured to receive AC electrical power. The AC stage includes a transformer including primary windings and secondary windings configured to be electromagnetically coupled to each other and electrically isolated from each other. The AC stage also includes at least one AC/AC converter having substantially no insulating features against the at least one substantially constant component of the electric field. The AC/AC converter is electrically coupled to at least one primary winding of the primary windings. The DC power transmission system also includes an AC/DC conversion stage positioned downstream of the AC stage. The AC/DC conversion stage includes an AC/DC rectifier configured to convert AC electrical power to DC electrical power without external control. The AC/DC rectifier is coupled to at least one secondary winding of the secondary windings.

In another aspect, a transmission end converter for a DC transmission system is provided. The transmission end converter is configured to generate an electric field including at least one component substantially constant with respect to time and at least one component that varies with time. The DC power transmission system includes an alternating current (AC) stage configured to receive AC electrical power. The AC stage includes a transformer including primary windings and secondary windings configured to be electromagnetically coupled to each other and electrically isolated from each other. The AC stage also includes an AC/AC converter having substantially no insulating features against the at least one substantially constant component of the electric field. The AC/AC converter is electrically coupled to at least one primary winding of the primary windings. The transmission end converter also includes an AC/DC conversion stage positioned downstream of the AC stage. The AC/DC conversion stage includes an AC/DC rectifier configured to convert AC electrical power to DC electrical power without external control. The AC/DC rectifier is coupled to at least one secondary winding of the secondary windings.

In yet another aspect, a method of assembling a transmission end converter is provided. The transmission end converter is configured to receive alternating current (AC) electrical power and convert the AC electrical power to direct current (DC) electrical power. The transmission end converter is also configured to generate an electric field including at least one component substantially constant with respect to time and at least one component that varies with time. The method includes electrically coupling an AC/AC converter to at least one primary winding of a plurality of primary windings of a transformer, thereby at least partially forming an AC stage. The AC/AC converter and the primary windings have substantially no insulating features against the at least one substantially constant component of the electric field. The method also includes electromagnetically coupling secondary windings of the transformer to the primary windings. The method further includes electrically coupling an AC/DC rectifier to at least one secondary winding of the secondary windings, thereby at least partially forming an AC/DC conversion stage. The AC/DC rectifier is positioned downstream of the transformer.

DRAWINGS

These and other features, aspects, and advantages of the present disclosure will become better understood when the following detailed description is read with reference to the accompanying drawings in which like characters represent like parts throughout the drawings, wherein.

Figure 1:
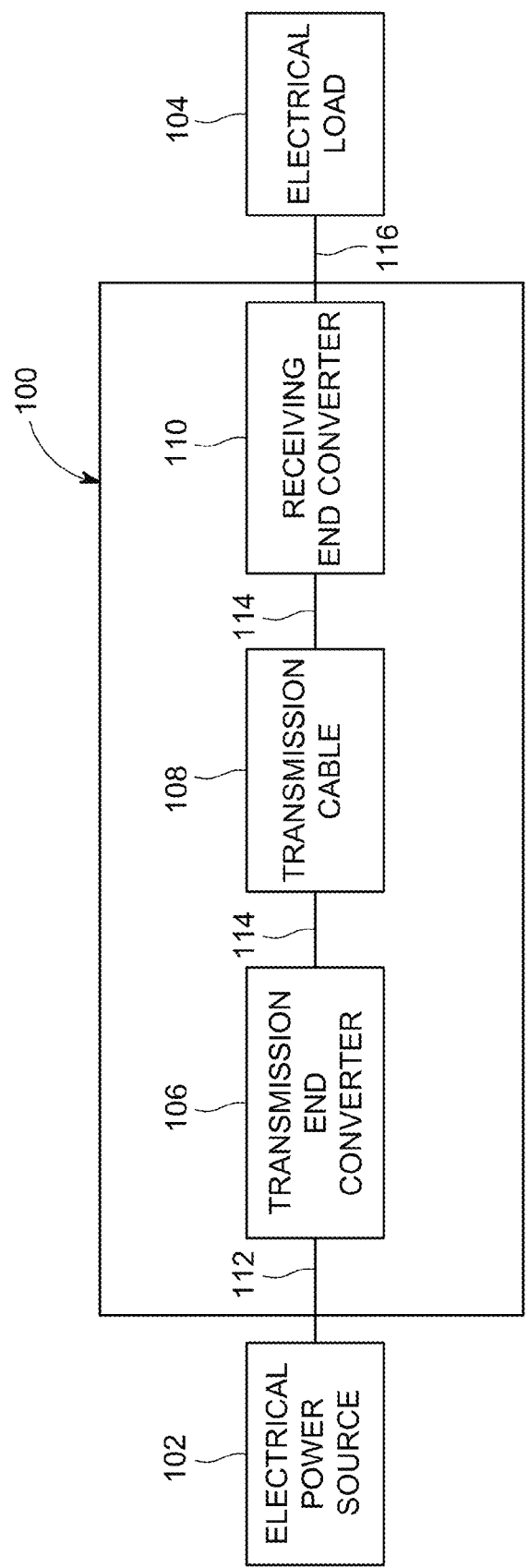
FIG. 1 is a schematic view of an exemplary power system including a DC power transmission system.

Unless otherwise indicated, the drawings provided herein are meant to illustrate features of embodiments of the disclosure. These features are believed to be applicable in a wide variety of systems including one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Orienting language, as used herein throughout the specification and the claims, is solely used to facilitate the description of elements with respect to each other, and does not define their orientation with respect to any other frame of reference. Accordingly, elements modified by terms such as "top" and "bottom" may be oriented in any other direction with respect to an outside frame of reference unless the context or language clearly indicates otherwise.

Furthermore, references to one "implementation" or one "embodiment" of the subject matter described herein are not intended to be interpreted as excluding the existence of additional implementations that also incorporate the recited features.

The embodiments described herein disclose a DC power transmission system that transmits electrical power from an AC electrical source to an electrical load, for example a DC motor. The DC power transmission system includes a transmission end converter that converts the AC power to DC power. Specifically, the transmission end converter described herein includes an AC stage that includes an AC/AC converter and an AC/DC conversion stage that includes an AC/DC rectifier coupled to the AC stage through a transformer that includes primary and secondary windings electromagnetically coupled to each other. As such, the transmission end converter is configured to generate an electric field including at least one field component substantially constant with respect to time and at least one field component that varies with time. The transmission end converter described herein facilitates reducing the number of AC/DC conversion stage components that require high voltage DC insulation with respect to ground. Moreover, at least some of the components within the transmission end converter described herein have substantially no insulation with respect to the substantially constant components of the electrical field, i.e., they have substantially no DC insulation to ground. More specifically the AC/AC converter and primary windings of the transformer have a reduced amount of total insulation to ground compared to a DC/DC converter operated at the same transmission voltage level. Accordingly, the AC/AC converter and the transformer have a reduced cost in DC insulation and a reduced size footprint compared to known DC/DC converters.

FIG. 1 is a schematic view of an exemplary DC power transmission system 100. DC power transmission system 100 transmits electrical power from an electrical power source 102, e.g., without limitation, the electrical grid or an AC generator, to an electrical load 104, e.g., without limitation, a motor. DC power transmission system 100 includes a transmission end converter 106 for receiving input AC power 112 from electrical power source 102 and converting AC power to DC power. DC transmission system 100 also includes transmission cables 108 for carrying the DC power. Transmission cables 108 are a plurality of electrically conductive cables capable of carrying electrical current, such as high voltage DC power 114. In the exemplary embodiment, transmission cables 108 include a high voltage line of a positive polarity (not shown) and a return line of a negative polarity (not shown). DC transmission system 100 also includes a receiving end converter 110. Receiving end converter 110 converts high voltage DC power 114 into low voltage power 116 that is useable by electrical load 104. In the exemplary embodiment, receiving end converter 110 includes at least one of a step down transformer and an inverter (neither shown) such that low voltage power 116 is at least one of low voltage DC power and low voltage AC power.

In the exemplary embodiment, electrical power source 102 and transmission end converter 106 are positioned on non-submerged platforms. Also, electrical load 104 and receiving end converter 110 are positioned within submerged vessels, and transmission cables 108 are substantially submerged. Alternatively, DC power transmission system 100 is positioned anyplace with any configuration that facilitates operation as described herein.

In operation, transmission end converter 106 receives input AC power 112 from electrical power source 102 and converts input AC power 112 into medium to high voltage DC power 114 for transmission through transmission cables 108. In the exemplary embodiment input AC power 112 is three-phase power, and transmission end converter 106 converts each phase of the three phase power into medium to high voltage DC power 114. Medium to high voltage DC power 114 is carried by transmission cables 108 to receiving end converter 110 where it is converted to low-voltage power 116 and provided to electrical load 104.

Figure 2:
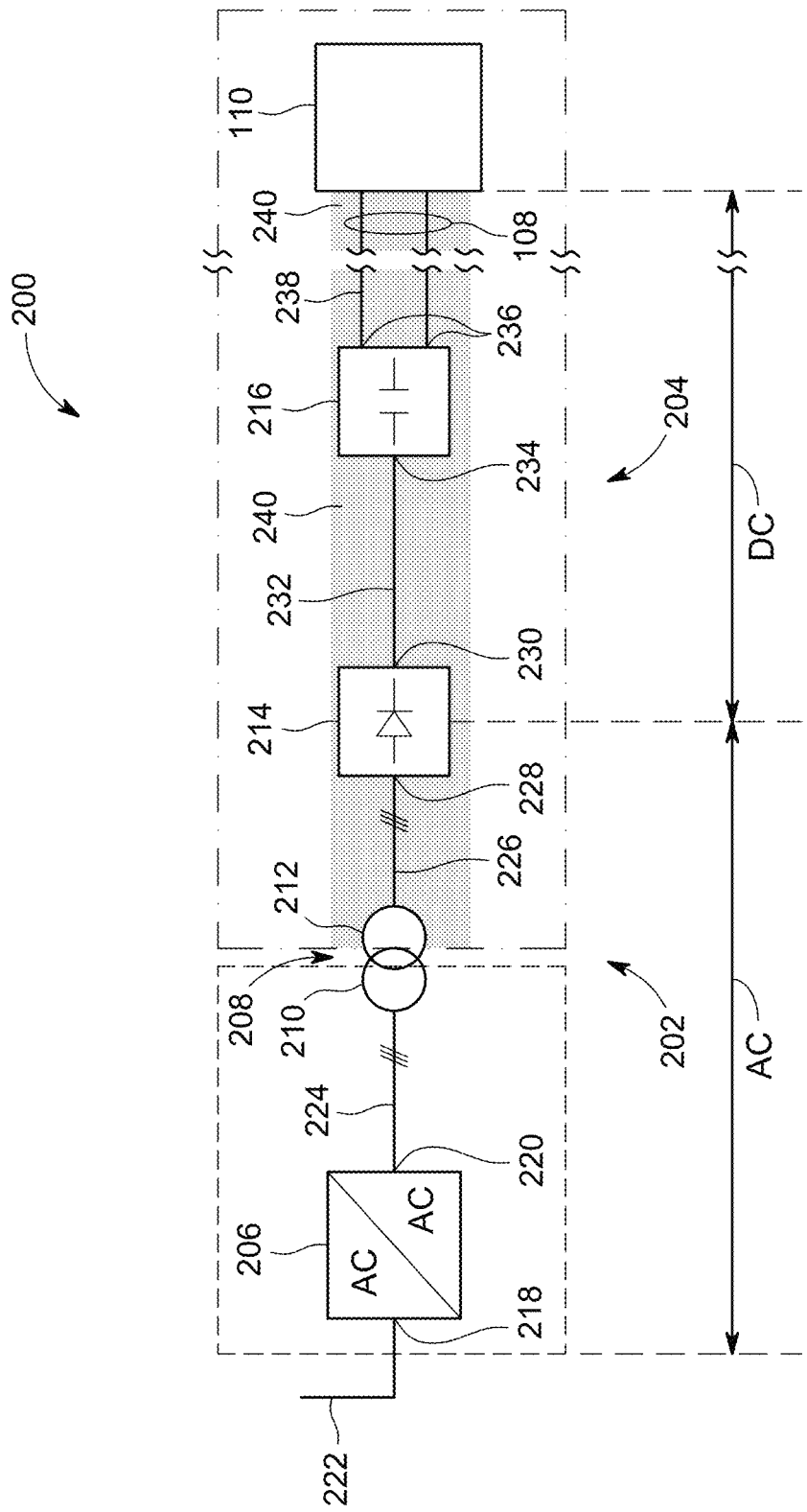
FIG. 2 is a schematic view of an exemplary transmission end converter that may be used with the DC power transmission system shown in FIG. 1.

FIG. 2 is a schematic view of an exemplary transmission end converter 200 that may be used with DC transmission system 100 (shown in FIG. 1). Transmission end converter 200 is configured to receive AC power having a predetermined input voltage and transmit DC power at a predetermined transmission voltage, also referred to as DC link voltage. In the exemplary embodiment, transmission end converter 200 includes an active AC stage 202 and a passive AC/DC conversion stage 204. Active AC stage 202 includes an AC/AC converter 206 and a step-up transformer 208. Step-up transformer 208 includes a plurality of primary windings 210 and a plurality of secondary windings 212, where windings 210 and 212 are electromagnetically coupled when energized. Passive AC/DC conversion stage 204 includes an AC/DC rectifier 214. In the exemplary embodiment, AC/DC rectifier 214 is a 12-pulse diode bridge rectifier configured to convert stepped-up AC power from step-up transformer 208 to medium voltage DC (MVDC) and/or high voltage DC (HVDC) power. As used herein, the term "active" refers to the use of active control features to regulate operation of AC/AC converter 206, e.g., and without limitation, insulated gate bipolar transistors (IGBTs) and thyristors. Also, as used herein, the term "passive" refers to the use of devices such as 12-pulse diode bridge rectifiers that do not require regulation by external control systems and devices to rectify the incoming three-phase AC power to DC power. Alternatively, AC/DC rectifier 214 has any configuration that enables converter 200 to operate as described herein.

In some embodiments, either, or both, of AC/AC converter 206 and step-up transformer 208 include phase-shifting features to facilitate control of real power flow through transmission end converter 200 and at least a portion of DC transmission system 100, and to facilitate reducing DC ripple.

Also, in the exemplary embodiment, passive AC/DC conversion stage 204 includes at least one filtering component 216 positioned downstream of AC/DC rectifier 214 to filter DC harmonics and ripple voltages. Alternatively, passive AC/DC conversion stage 204 does not include filtering component 216.

Further, in the exemplary embodiment, AC/AC converter 206 is positioned upstream of step-up transformer 208 such that an input terminal 218 of AC/AC converter 206 is electrically coupled to electrical power source 102 (shown in FIG. 1). An output terminal 220 of AC/AC converter 206 is coupled to at least one winding of primary windings 210.

Moreover, in the exemplary embodiment, secondary windings 212 have a greater number of turns than primary windings 210 such that the voltage of output AC power 224 is stepped up to a higher voltage in boosted AC power 226. In one embodiment, step-up transformer 208 is a high frequency transformer configured to operate at high frequencies, e.g., without limitation, between 100 Hz and 20 kHz. In such an embodiment, the size of transformer 208 is significantly reduced as compared with a standard transformer operating at standard frequencies, e.g., 50 Hz or 60 Hz. Accordingly, the size of transmission end converter 200 may be reduced.

AC/DC rectifier 214 is positioned downstream of AC/AC converter 206 and step-up transformer 208 such that an input terminal 228 of AC/DC rectifier 214 is electrically coupled with at least one winding of secondary windings 212. In the exemplary embodiment, output terminal 230 of AC/DC rectifier 214 is coupled to filtering component 216. Alternatively, output terminal 230 is coupled directly to transmission cables 108. In operation, AC/DC rectifier 214 receives boosted AC power 226 and converts boosted AC power 226 to an output DC power 232.

Output DC power 232 from AC/DC rectifier 214 may contain harmonics and/or substantial DC ripple voltages as residual parts of the conversion process. Transmission end converter 200 includes filtering component 216 positioned downstream of AC/DC rectifier 214 such that input terminal 234 of filter component 216 receives output DC power 232. Filtering component 216 is configured to filter output DC power 232 to facilitate reducing harmonics and/or ripple voltages in the DC power to produce filtered DC power 238. Filtering component 216 provides filtered DC power 238 to output terminal 236, where it is then provided to transmission cables 108. Filtering component 216 includes any devices that enable operation of transmission end converter 200 as described herein, including, without limitation, diodes, capacitors, and inductors, or any combination thereof, such that filtering component 216 facilitates reducing the ripple voltage and/or harmonics of output DC power 232.

In operation, AC/AC converter 206 receives input AC power 222 from electrical power source 102 at input terminal 218 and transmits output AC power 224 from output terminal 220. In the exemplary embodiment, AC/AC converter 206 controls the voltage of output AC power 224. Also, in the exemplary embodiment, AC/AC converter 206 controls the frequency of output AC power 224 such that input AC power 222 has a higher or lower frequency than input AC power 222. For example, in some embodiments, AC/AC converter 206 boosts the frequency of input AC power 222 such that the frequency of output AC power 224 is a high frequency, i.e., in a range between 100 Hz to 20 KHz. Alternatively, AC/AC converter 206 controls one of the voltage and the frequency of output AC power 224.

Also, in operation, AC/DC rectifier 214 receives boosted AC power 226 and converts boosted AC power 226 to output DC power 232 that is transmitted to filtering component 216. Filtering component 216 transmits filtered DC power 238 to transmission cables 108. As such, transmission end converter 200 generates an electric field including at least one field component substantially constant with respect to time and at least one field component that varies with time.

At least a portion of the components in active AC stage 202 are electrically isolated from DC power in passive AC/DC conversion stage 204 by step-up transformer 208. Specifically, step-up transformer 208 electrically isolates the portion of transmission end converter 200 upstream of secondary windings 212 from the portion of transmission end converter 200 downstream of primary windings 210 during a DC fault on AC/DC conversion stage 204. More specifically, during a DC fault in passive AC/DC conversion stage 204, the DC current passes through secondary windings 212, but does not pass through primary windings 210. Accordingly, primary windings 210 have a substantially reduced amount of DC insulation with respect to ground for the DC transmission voltage, while secondary windings 212 are DC-insulated with respect to ground for the DC transmission voltage. In some embodiments, primary windings 210 have substantially no DC insulation to ground.

Also, accordingly, insulation 240 facilitates providing the components downstream of primary windings 210 DC insulation to ground, i.e., insulation 240 extends from secondary windings 212 to receiving end converter 110. Alternatively, if receiving end converter 110 is an extended distance from filtering component 216 such that transmission cables 108 are long, insulation 240 will end just downstream of filtering component 216.

Further, accordingly, components in active AC stage 202 upstream of secondary windings 212 do not need to be DC insulated to ground, and, as such, primary windings 210 and AC/AC converter 206 have substantially no insulation with respect to the substantially constant components of the electrical field generated by transmission end converter 200, i.e., they have substantially no DC insulation to ground, which facilitates reducing the amount of DC insulation in transmission end converter 200. However, such components in active AC stage 202 upstream of secondary windings 212 have the necessary AC insulation for the field components that vary with time.

Such configuration facilitates reducing the amount of DC insulation in transmission end converter 200. Moreover, in the exemplary embodiment, all components in passive AC/DC conversion stage 204 are passive components, e.g., and without limitation, diodes, transformer windings, and capacitors, and require less DC insulation than active DC components. The reduced insulation facilitates reducing the cost and size footprint of transmission end converter 200. In some embodiments, those components using insulation 240, i.e., secondary windings 212, AC/DC rectifier 214, and filtering component 216 may be positioned within a common oil bath to facilitate heat removal therefrom.

In the exemplary embodiment, transmission end converter 200 is a modular system. Specifically, in some embodiments, transmission end converter 200 is one, integrated, unitary module of one or more modules. Also, in some embodiments, each component of transmission end converter 200 is modular such that rapid assembly and component replacement is facilitated. Further, in other embodiments, active AC stage 202 and/or passive AC/DC conversion stage 204 are each independent, integrated, unitary modules that are coupled to each other proximate AC/DC rectifier 214. Moreover, in some embodiments, active AC stage 202 and/or passive AC/DC conversion stage 204 are each independent, integrated, unitary sub-modules that are coupled to each other proximate AC/DC rectifier 214 to form transmission end converter 200.

Figure 3:
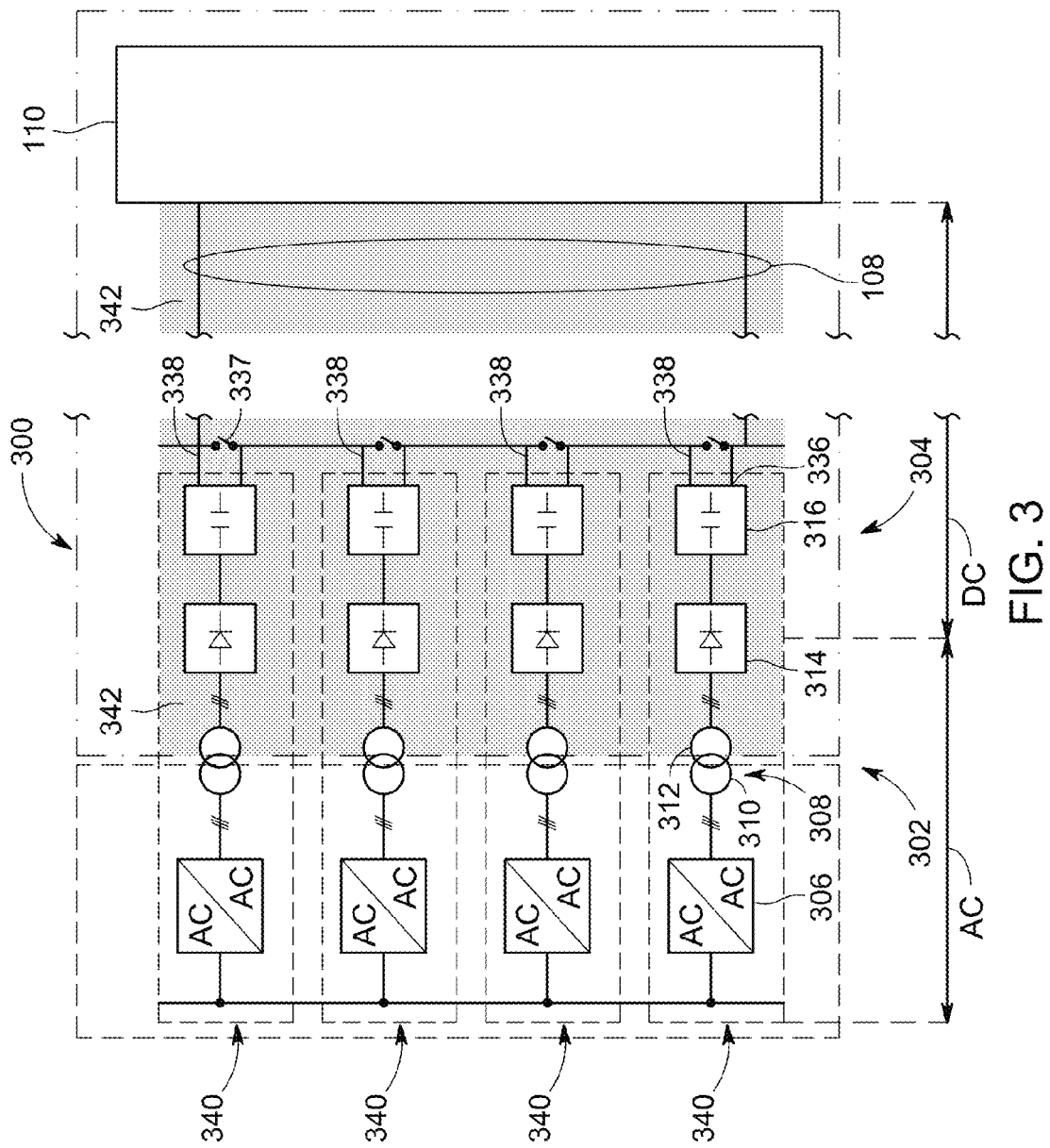
FIG. 3 is a schematic view of an alternative transmission end converter that may be used with the DC power transmission system shown in FIG. 1.

FIG. 3 is a schematic view of an alternative transmission end converter 300 that may be used with DC power transmission system 100 (shown in FIG. 1). In this alternative embodiment, transmission end converter 300 has an active AC stage 302 and a passive AC/DC conversion stage 304. Active AC stage 302 includes a plurality of parallel AC/AC converters 306 and a plurality of parallel step-up transformers 308, where each AC/AC converter 306 is coupled to one step-up transformer 308. Step-up transformer 308 includes a plurality of primary windings 310 and a plurality of secondary windings 312, where windings 310 and 312 are electromagnetically coupled when energized. Passive AC/DC conversion stage 304 includes a plurality of parallel AC/DC rectifiers 314 and filtering components 316. Components of transmission end converter 300 function in a like manner as similar components in transmission end converter 200 (shown in FIG. 2). Specifically, AC/AC converters 306 operate similarly to AC/AC converter 206, step-up transformers 308 operate similarly to step-up transformer 208, AC/DC rectifiers 314 operate similarly to AC/DC rectifier 214, and filtering components 316 operate similarly to filtering component 216 described above with respect to FIG. 2. In the exemplary embodiment, the plurality of components are arranged in parallel power conversion sections 340, with each power conversion section 340 including an AC/AC converter 306, step-up transformer 308, AC/DC rectifier 314, and filtering component 316.

Output terminals 336 of each filtering component 316 are serially coupled together through a plurality of switches 337 (normally closed and shown in the open position) such that the voltage levels of filtered DC power 338 output by each power conversion section 340 is summed to produce an overall transmission voltage for transmission end converter 110. In the exemplary embodiment, each AC/AC converter 306 is configured to control the voltage of filtered DC power 338 output by each respective power conversion section 340. For example, in one embodiment, the voltage output by each power conversion section 340 is substantially similar. Alternatively, each AC/AC converter 306 is configured to control the voltage output by each power conversion section 340 in any manner that enables transmission end converter 300 to output DC power at the predetermined transmission voltage. Operation of each power conversion section 340 is substantially similar to that for transmission end converter 200.

At least a portion of the components in active AC stage 302 are electrically isolated from DC power in passive AC/DC conversion stage 304 by step-up transformer 308. Specifically, each step-up transformer 308 electrically isolates the portion of power conversion section 340 upstream of secondary windings 312 from the portion of power conversion section 340 downstream of primary windings 310 during a DC fault on AC/DC conversion stage 304. More specifically, during a DC fault in passive AC/DC conversion stage 304, the DC current passes through secondary windings 312, but does not pass through primary windings 310. Accordingly, primary windings 310 have a substantially reduced amount of DC insulation with respect to ground for the DC transmission voltage, while secondary windings 312 are DC-insulated with respect to ground for the DC transmission voltage. In some embodiments, primary windings 310 have substantially no DC insulation to ground.

Also, accordingly, insulation 342 facilitates providing the components downstream of primary windings 310 DC insulation to ground, i.e., insulation 342 extends from secondary windings 312 to receiving end converter 110. Alternatively, if receiving end converter 110 is an extended distance from filtering components 316 such that transmission cables 108 are long, insulation 342 will end just downstream of filtering components 316.

Further, accordingly, components in active AC stage 302 upstream of secondary windings 312 do not need to be DC insulated to ground, and, as such, primary windings 310 and AC/AC converter 306 have substantially no insulation with respect to the substantially constant components of the electrical field generated by transmission end converter 200, i.e., they have substantially no DC insulation to ground, which facilitates reducing the amount of DC insulation in transmission end converter 300. However, such components in active AC stage 302 upstream of secondary windings 312 have the necessary AC insulation for the field components that vary with time.

Moreover, in the exemplary embodiment, all components in passive AC/DC conversion stage 304 are passive components, e.g., and without limitation, diodes, transformer windings, and capacitors, and require less DC insulation than active DC components. The reduced insulation facilitates reducing the cost and size footprint of transmission end converter 300. In some embodiments, those components using insulation 342, i.e., secondary windings 312, AC/DC rectifiers 314, and filtering components 316 may be positioned within a common oil bath to facilitate heat removal therefrom.

In the exemplary embodiment, transmission end converter 300 is a modular system. Specifically, transmission end converter 300 is formed from the plurality of parallel power conversion sections 340, where each section 340 is one, integrated, unitary module. Also, in some embodiments, each component of power conversion sections 340 is modular such that rapid assembly and component replacement is facilitated. Further, in other embodiments, active AC stage 302 and/or passive AC/DC conversion stage 304 are each independent, integrated, unitary modules that are coupled to each other proximate AC/DC rectifiers 314. Moreover, in some embodiments, each active AC stage 302 and/or each passive AC/DC conversion stage 304 are each independent, integrated, unitary sub-modules that are coupled to each other proximate AC/DC rectifier 314 to form each power conversion section 340.

Figure 4:
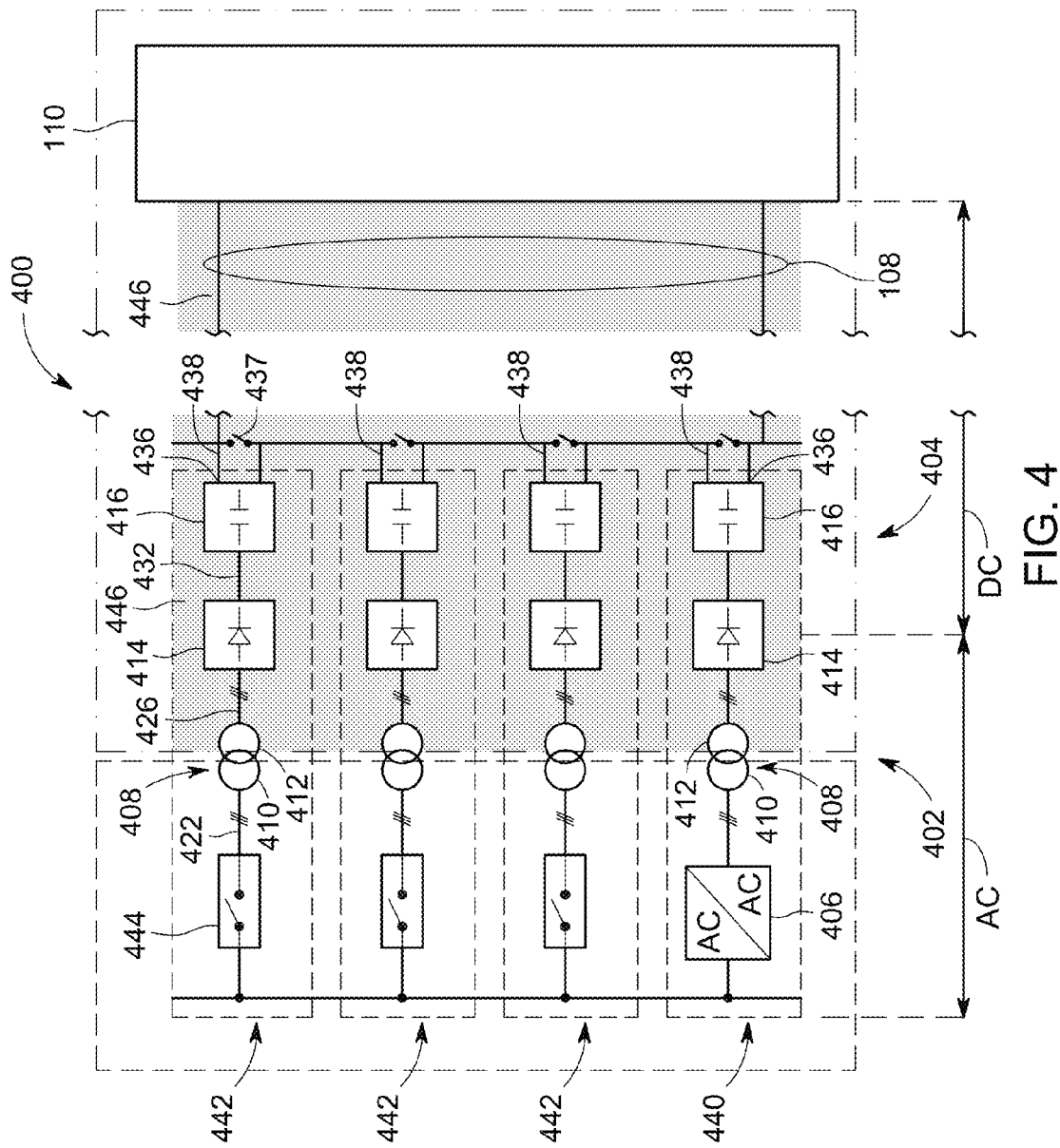
FIG. 4 is a schematic view of another alternative transmission end converter that may be used with the DC power transmission system shown in FIG. 1 having a plurality of power conversion sections including at least one fine power conversion section and at least one coarse power conversion section.

FIG. 4 is a schematic view of another alternative transmission end converter 400 that may be used with DC power transmission system 100 (shown in FIG. 1). In this alternative embodiment, transmission end converter 400 includes a plurality of parallel power conversion sections including at least one fine power conversion section 440 and at least one coarse power conversion section 442. Each fine power conversion section 440 includes an AC/AC converter 406, step-up transformer 408, AC/DC rectifier 414, and filtering component 416. Step-up transformer 408 includes a plurality of primary windings 410 and a plurality of secondary windings 412, where windings 410 and 412 are electromagnetically coupled when energized. Each coarse power conversion section 442 includes a switch 444, step-up transformer 408, AC/DC rectifier 414, and filtering component 416. Switch 444 is any switching device that enables operation of coarse power conversion section 442 and transmission end converter 400 as described herein, including, without limitation, a semiconductor switching device and an electro-mechanical switching device. Otherwise, components of transmission end converter 400 function in a like manner as similar components in transmission end converter 200 (shown in FIG. 2). Specifically, AC/AC converters 406 operate similarly to AC/AC converter 206, step-up transformers 408 operate similarly to step-up transformer 208, AC/DC rectifiers 414 operate similarly to AC/DC rectifier 214, and filtering components 416 operate similarly to filtering component 216 described above with respect to FIG. 2.

Output terminals 436 of each filtering component 416 are serially coupled together through a plurality of switches 437 (normally closed and shown in the open position) such that the voltage levels of filtered DC power 438 output by each power conversion section 440 and 442 is summed to produce an overall transmission voltage for transmission end converter 400. In the exemplary embodiment, the transmission voltage may be controlled in block sections by opening and/or closing switches 444 of coarse power conversion sections 442 and/or finely controlled by altering the parameters of AC/AC converter 406.

In operation, fine power conversion section 440 controls the transmission voltage of transmission end converter 400 with AC/AC converter 406. More specifically, AC/AC converter 406 enables fine power conversion section 440 to control the transmission voltage of transmission end converter 400 by adjusting the voltage output from active AC stage 402 to passive AC/DC conversion stage 404. Additionally, coarse power conversion section 442 controls the transmission voltage of transmission end converter 400 based on opening and closing switches 444. More specifically, when closed, switches 444 conduct input AC power 422 to step-up transformer 408 where it is stepped up to boosted AC power 426 and provided to AC/DC rectifier 414. AC/DC rectifier 414 rectifies boosted AC power 426 and outputs output DC power 432. Output DC power 432 may then be filtered by filtering component 416, and output to transmission cables 108. When opened, switches 444 serve as an open circuit that prevents input AC power 422 from reaching AC/DC rectifier 414. Accordingly, no DC power is output from coarse power conversion section 442 when switch 444 is open.

At least a portion of the components in active AC stage 402 are electrically isolated from DC power in passive AC/DC conversion stage 404 by step-up transformer 408. Specifically, each step-up transformer 408 electrically isolates the portion of power conversion section 440 and/or 442 upstream of secondary windings 412 from the portion of power conversion section 440 downstream of primary windings 410 during a DC fault on AC/DC conversion stage 404. More specifically, during a DC fault in passive AC/DC conversion stage 404, the DC current passes through secondary windings 412, but does not pass through primary windings 410. Accordingly, primary windings 410 have a substantially reduced amount of DC insulation with respect to ground for the DC transmission voltage, while secondary windings 412 are DC-insulated with respect to ground for the DC transmission voltage. In some embodiments, primary windings 410 have substantially no DC insulation to ground.

Also, accordingly, insulation 446 facilitates providing the components downstream of primary windings 410 DC insulation to ground, i.e., insulation 446 extends from secondary windings 412 to receiving end converter 110. Alternatively, if receiving end converter 110 is an extended distance from filtering components 416 such that transmission cables 108 are long, insulation 446 will end just downstream of filtering components 416.

Further, accordingly, components in active AC stage 402 upstream of secondary windings 412 do not need to be DC insulated to ground, and, as such, primary windings 410 and AC/AC converter 406 have substantially no DC insulation to ground which facilitates reducing the amount of DC insulation in transmission end converter 400.

Moreover, accordingly, components in active AC stage 402 upstream of secondary windings 412 do not need to be DC insulated to ground, and, as such, primary windings 410 and AC/AC converter 406 have substantially no insulation with respect to the substantially constant components of the electrical field generated by transmission end converter 400, i.e., they have substantially no DC insulation to ground, which facilitates reducing the amount of DC insulation in transmission end converter 400. However, such components in active AC stage 402 upstream of secondary windings 412 have the necessary AC insulation for the field components that vary with time.

In addition, in the exemplary embodiment, all components in passive AC/DC conversion stage 404 are passive components, e.g., and without limitation, diodes, transformer windings, and capacitors, and require less DC insulation than active DC components. The reduced insulation facilitates reducing the cost and size footprint of transmission end converter 400. In some embodiments, those components using insulation 446, i.e., secondary windings 412, AC/DC rectifiers 414, and filtering components 416 may be positioned within a common oil bath to facilitate heat removal therefrom.

In the exemplary embodiment, transmission end converter 400 is a modular system. Specifically, transmission end converter 400 is formed from the plurality of fine power conversion sections 440 and coarse power conversion sections 442, where each section 440 and 442 is one, integrated, unitary module. Also, in some embodiments, each component of power conversion sections 440 and/or 442 is modular such that rapid assembly and component replacement is facilitated. Further, in other embodiments, active AC stage 402 and/or passive AC/DC conversion stage 404 are each independent, integrated, unitary modules that are coupled to each other proximate AC/DC rectifiers 414. Moreover, in some embodiments, each active AC stage 402 and/or each passive AC/DC conversion stage 404 are each independent, integrated, unitary sub-modules that are coupled to each other proximate AC/DC rectifier 414 to form each power conversion section 440 and 442.

Figure 5:
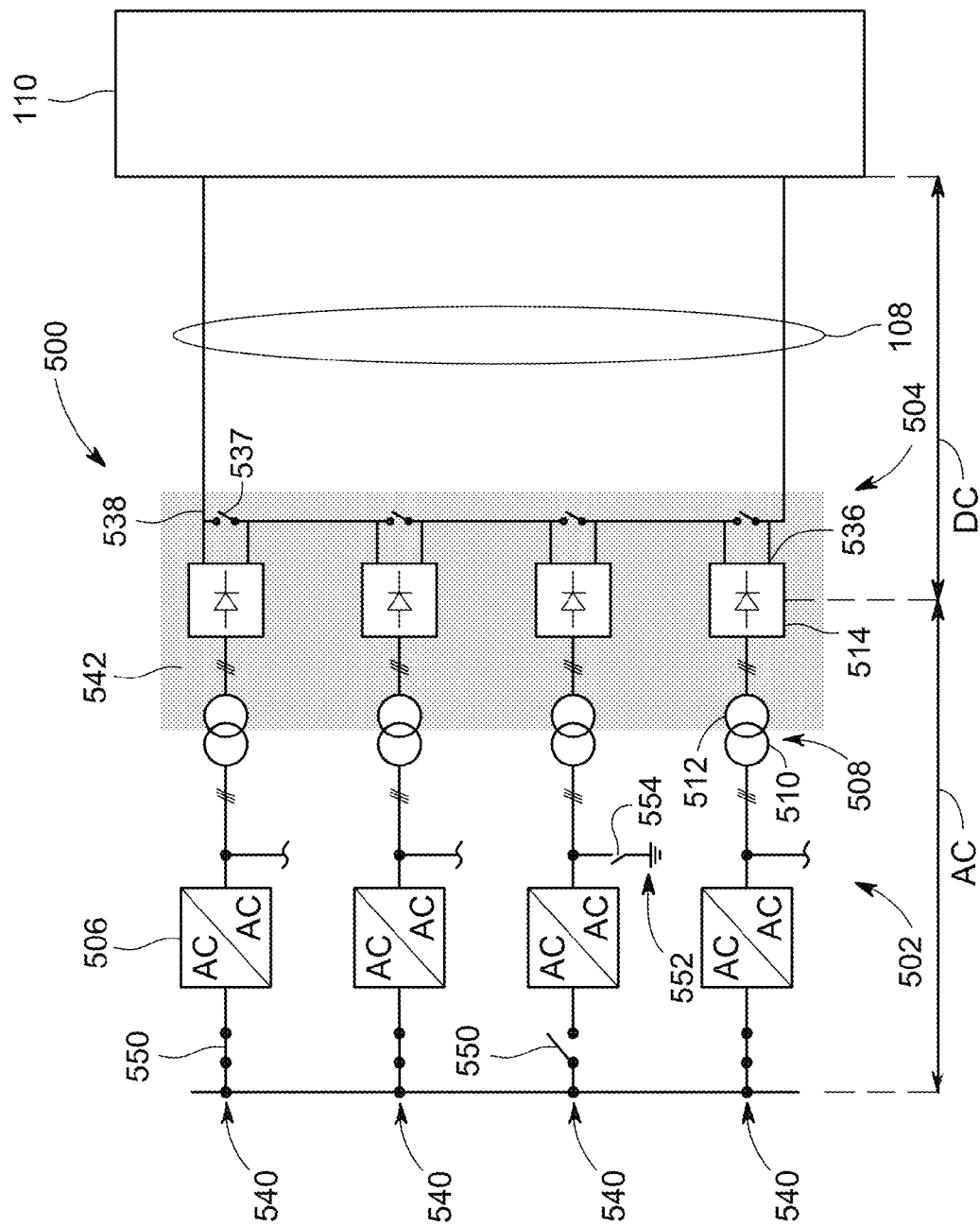
FIG. 5 is schematic view of yet another alternative transmission end converter that may be used with the DC power transmission system shown in FIG. 1 having a plurality of AC isolation switches.

FIG. 5 is schematic view of yet another alternative transmission end converter 500 that may be used with DC power transmission system 100 (shown in FIG. 1). In this alternative embodiment, transmission end converter 500 is similar to transmission end converter 300 (shown in FIG. 3) with the exceptions described below. Each power conversion section 540 (four shown in FIG. 5) is substantially identical and, in the exemplary embodiment, includes an AC disable switch 550 positioned upstream and in series with each parallel AC/AC converter 506. Also, each power conversion section 540 includes a grounding device 552 that includes a grounding switch 554 coupled downstream of each AC/AC converter 506.

Also, in this alternative embodiment, transmission end converter 500 has an active AC stage 502 and a passive AC/DC conversion stage 504. Active AC stage 502 includes parallel AC/AC converters 506 and a plurality of parallel step-up transformers 508, where each AC/AC converter 506 is coupled to one step-up transformer 508. Step-up transformer 508 includes a plurality of primary windings 510 and a plurality of secondary windings 512, where windings 510 and 512 are electromagnetically coupled when energized. Passive AC/DC conversion stage 504 includes a plurality of parallel AC/DC rectifiers 514. However, unlike passive AC/DC conversion stage 304 (shown in FIG. 3), transmission end converter 500 does not include any DC filtering components. Components of transmission end converter 500 function in a like manner as similar components in transmission end converter 300. Specifically, AC/AC converters 506 operate similarly to AC/AC converters 306, step-up transformers 508 operate similarly to step-up transformers 308, and AC/DC rectifiers 514 operate similarly to AC/DC rectifiers 314 with respect to FIG. 3. In the exemplary embodiment, the plurality of components are arranged in parallel power conversion sections 540, with each power conversion section 540 including an AC/AC converter 506, step-up transformer 508, and AC/DC rectifier 514 as well as an AC disable switch 550 and grounding device 552 that includes grounding switch 554. Some embodiments may include a DC disable switch (not shown) proximate to and/or downstream of AC/DC rectifier 514, where the DC disable switch is similar to AC disable switch 550.

Output terminals 536 of each AC/DC rectifier 514 are serially coupled together through a plurality of switches 537 (normally closed and shown in the open position) such that the voltage levels of DC power 538 output by each power conversion section 540 is summed to produce an overall transmission voltage for transmission end converter 110. In the exemplary embodiment, each AC/AC converter 506 is configured to control the voltage of DC power 538 output by each respective power conversion section 540. For example, in one embodiment, the voltage output by each power conversion section 540 is substantially similar. Alternatively, each AC/AC converter 506 is configured to control the voltage output by each power conversion section 540 in any manner that enables transmission end converter 500 to output DC power at the predetermined transmission voltage. Operation of each power conversion section 540 is substantially similar to that for power conversion section 340.

At least a portion of the components in active AC stage 502 are electrically isolated from DC power in passive AC/DC conversion stage 504 by step-up transformer 508. Specifically, each step-up transformer 508 electrically isolates the portion of power conversion section 540 upstream of secondary windings 512 from the portion of power conversion section 540 downstream of primary windings 510 during a DC fault on AC/DC conversion stage 504. More specifically, during a DC fault in passive AC/DC conversion stage 504, the DC current passes through secondary windings 512, but does not pass through primary windings 510. Accordingly, primary windings 510 have a substantially reduced amount of DC insulation with respect to ground for the DC transmission voltage, while secondary windings 512 are DC-insulated with respect to ground for the DC transmission voltage. In some embodiments, primary windings 510 have substantially no DC insulation to ground.

Also, accordingly, insulation 542 facilitates providing the components downstream of primary windings 510 DC insulation to ground, i.e., insulation 542 extends from secondary windings 512 to just downstream of AC/DC rectifiers 514. Alternatively, if receiving end converter 110 is a short distance from AC/DC rectifiers 514 such that transmission cables 108 are short, insulation 542 may extend to just receiving end converter 110.

Further, accordingly, components in active AC stage 502 upstream of secondary windings 512 do not need to be DC insulated to ground, and, as such, primary windings 510 and AC/AC converter 506 have substantially no DC insulation to ground which facilitates reducing the amount of DC insulation in transmission end converter 500.

Moreover, accordingly, components in active AC stage 502 upstream of secondary windings 512 do not need to be DC insulated to ground, and, as such, primary windings 510 and AC/AC converter 506 have substantially no insulation with respect to the substantially constant components of the electrical field generated by transmission end converter 500, i.e., they have substantially no DC insulation to ground, which facilitates reducing the amount of DC insulation in transmission end converter 500. However, such components in active AC stage 502 upstream of secondary windings 512 have the necessary AC insulation for the field components that vary with time.

In addition, in the exemplary embodiment, all components in passive AC/DC conversion stage 504 are passive components, e.g., and without limitation, diodes, transformer windings, and capacitors, and require less DC insulation than active DC components. The reduced insulation facilitates reducing the cost and size footprint of transmission end converter 500. In some embodiments, those components using insulation 542, i.e., secondary windings 512 and AC/DC rectifiers 514 may be positioned within a common oil bath to facilitate heat removal therefrom.

In the event that one of the parallel AC/AC converters 506 needs to be removed from service, the associated power conversion section 540 is isolated by opening the associated AC disable switch 550 and/or associated DC disable switch and closing the associated grounding switch 554. The associated switch 537 may remain closed and the remaining power conversion sections 540 may remain in service.

In the exemplary embodiment, transmission end converter 500 is a modular system. Specifically, transmission end converter 500 is formed from the plurality of power conversion sections 540, where each section 540 is one, integrated, unitary module. Also, in some embodiments, each component of power conversion sections 540 is modular such that rapid assembly and component replacement is facilitated. Further, in other embodiments, active AC stage 502 and/or passive AC/DC conversion stage 504 are each independent, integrated, unitary modules that are coupled to each other proximate AC/DC rectifiers 514. Moreover, in some embodiments, each active AC stage 502 and/or each passive AC/DC conversion stage 504 are each independent, integrated, unitary submodules that are coupled to each other proximate AC/DC rectifier 514 to form each power conversion section 540.

Figure 6:
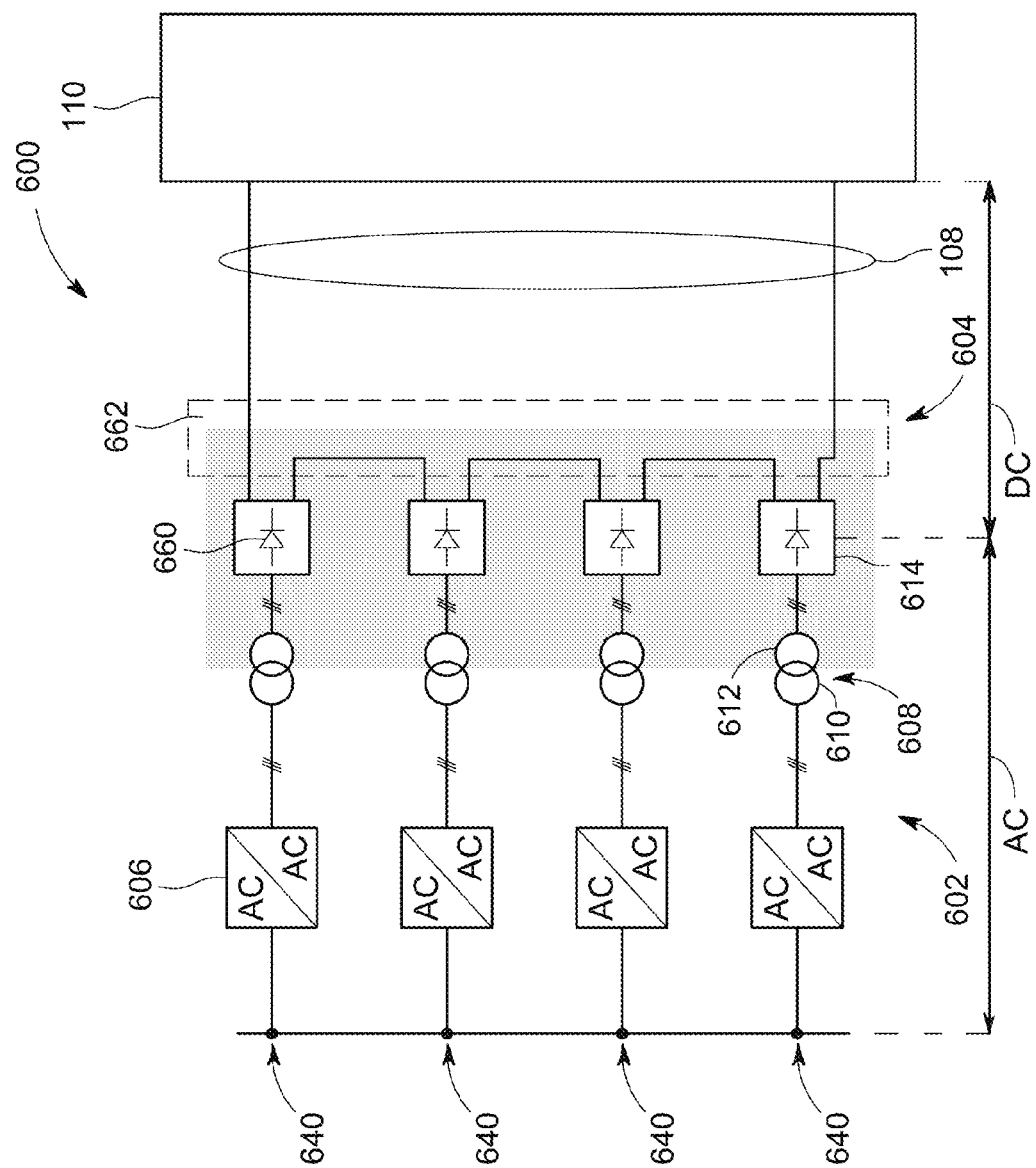
FIG. 6 is schematic view of yet another alternative transmission end converter that may be used with the DC power transmission system shown in FIG. 1 having an AC/DC rectifier with a plurality of diodes that have a short circuit failure mode.

FIG. 6 is schematic view of yet another alternative transmission end converter 600 that may be used with DC power transmission system 100 (shown in FIG. 1) having an AC/DC rectifier 614 with a plurality of diodes 660 that have a short circuit failure mode. Transmission end converter 600 is similar to transmission end converter 500 (shown in FIG. 5) with the exceptions described below. Each power conversion section 640 (four shown in FIG. 6) is substantially identical and does not include an AC disable switch 550 (shown in FIG. 5) positioned upstream and in series with each parallel AC/AC converter 606. Also, each power conversion section 640 does not include a grounding device 552 (shown in FIG. 5). Rather, to accommodate potential short circuit failures in passive AC/DC conversion stage 604, without increasing the size and weight of transmission end converter 600, diodes 660 are configured to respond to a predetermined current value typically associated with short circuits by failing to a stable short circuit condition with a resistance comparable to that of a normal diode 660 in forward conduction. Also, AC/DC rectifiers 614 are coupled through DC buses 662 configured to couple AC/DC rectifiers 614 in series on the DC side to facilitate continued current flow through a failed diode 660, thereby effectively removing the affected power conversion section 640 from service while maintaining the remainder of the power conversion sections 640 in service.

In the exemplary embodiment, transmission end converter 600 is a modular system. Specifically, transmission end converter 600 is formed from the plurality of power conversion sections 640, where each section 640 is one, integrated, unitary module. Also, in some embodiments, each component of power conversion sections 640 is modular such that rapid assembly and component replacement is facilitated. Further, in other embodiments, active AC stage 602 and/or passive AC/DC conversion stage 604 are each independent, integrated, unitary modules that are coupled to each other proximate AC/DC rectifiers 614. Moreover, in some embodiments, each active AC stage 602 and/or each passive AC/DC conversion stage 604 are each independent, integrated, unitary submodules that are coupled to each other proximate AC/DC rectifier 614 to form each power conversion section 640.

Figure 7:
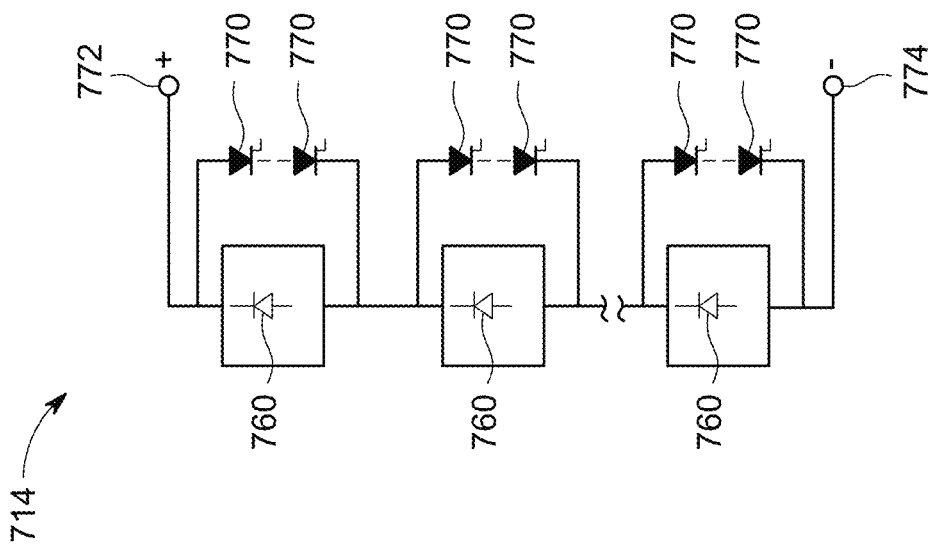
FIG. 7 is a schematic view of a portion of a passive DC/DC rectifier that may be used with the DC power transmission system shown in FIG. 1.

FIG. 7 is a schematic view of a portion of a passive DC/DC rectifier 714 that may be used with DC power transmission system 100 (shown in FIG. 1). DC/DC rectifier 714 includes a plurality of diodes 760 coupled in series. DC/DC rectifier 714 also includes at least one actively-controllable switch 770 (two shown in FIG. 7) in parallel with, and configured to bypass, each diode 760. Switches 770 are active semiconductor switching devices such as, without limitation, IGBTs and thyristors. Diodes 760 and switches 770 are positioned between a positive terminal 772 and a negative terminal 774. Terminals 772 and 774 are coupled to transmission cables 114 (shown in FIG. 1). Alternatively, terminals 772 and 774 are coupled to any transmission cables in any configuration that enables operation of DC/DC rectifier 714 and DC power transmission system 100 as described herein. DC/DC rectifier 714 may be used as DC/DC rectifiers 214, 314, 414, 514, and 614 (shown in FIGS. 2 through 6, respectively).

Non-submerged switches 770 facilitate reducing transmission of current to submerged receiving end converter 110 through submerged transmission cables 114 (both shown in FIG. 1) in the event of a DC fault, e.g., a short circuit condition on the DC portion of DC power transmission system 100. In addition, switches 770 also facilitate discharging the capacitive charge in cables 110. As such, once such a fault condition is sensed, switches 770 are operated to transmit current from positive terminal 772 to negative terminal 774, thereby bypassing diodes 760 that are biased in the opposite direction. Such controlled operation facilitates dissipating at least a portion of the stored energy in cables 110 through a predetermined, non-submerged portion in a manner that is at least partially controlled rather than dissipating the energy through the unknown location of the fault, likely submerged, in an uncontrolled manner. As such, the potential for damages at the fault location or other submerged portion of system 100 is decreased.

Figure 8:
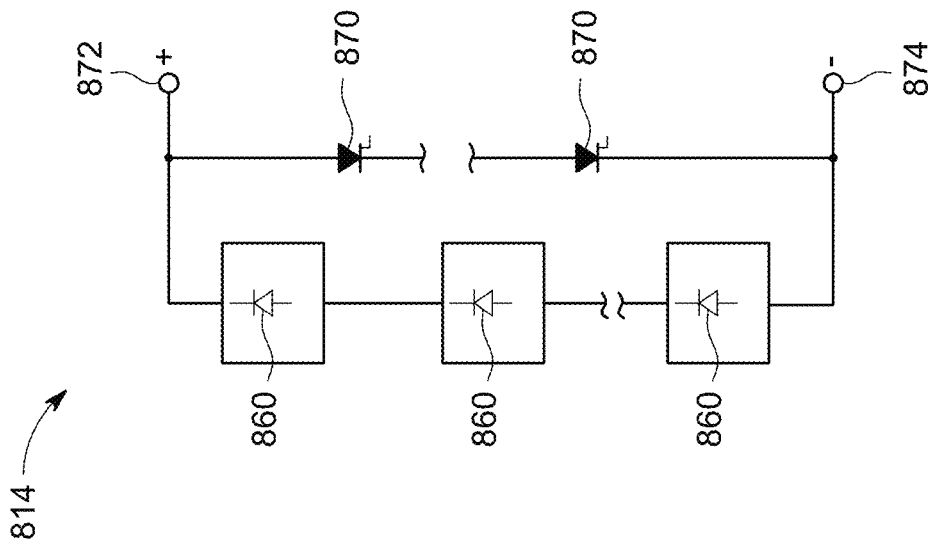
FIG. 8 is a schematic view of a portion of an alternative passive DC/DC rectifier that may be used with the DC power transmission system shown in FIG. 1.

FIG. 8 is a schematic view of a portion of an alternative passive DC/DC rectifier 814 that may be used with DC power transmission system 100 (shown in FIG. 1). DC/DC rectifier 814 includes a plurality of diodes 860 coupled in series. DC/DC rectifier 814 also includes a plurality of actively-controllable switches 870 coupled in series (two shown in FIG. 8) with each other and coupled in parallel with, and configured to bypass, all of diodes 860. Switches 870 are active semiconductor switching devices such as, without limitation, IGBTs and thyristors. Diodes 860 and switches 870 are positioned between a positive terminal 872 and a negative terminal 874. Terminals 872 and 874 are coupled to transmission cables 114 (shown in FIG. 1). Alternatively, terminals 872 and 874 are coupled to any transmission cables in any configuration that enables operation of DC/DC rectifier 814 and DC power transmission system 100 as described herein. Operation of switches 870 are similar to that described above for switches 770 (shown in FIG. 7). DC/DC rectifier 814 may be used as DC/DC rectifiers 214, 314, 414, 514, and 614 (shown in FIGS. 2 through 6, respectively).

Figure 9:
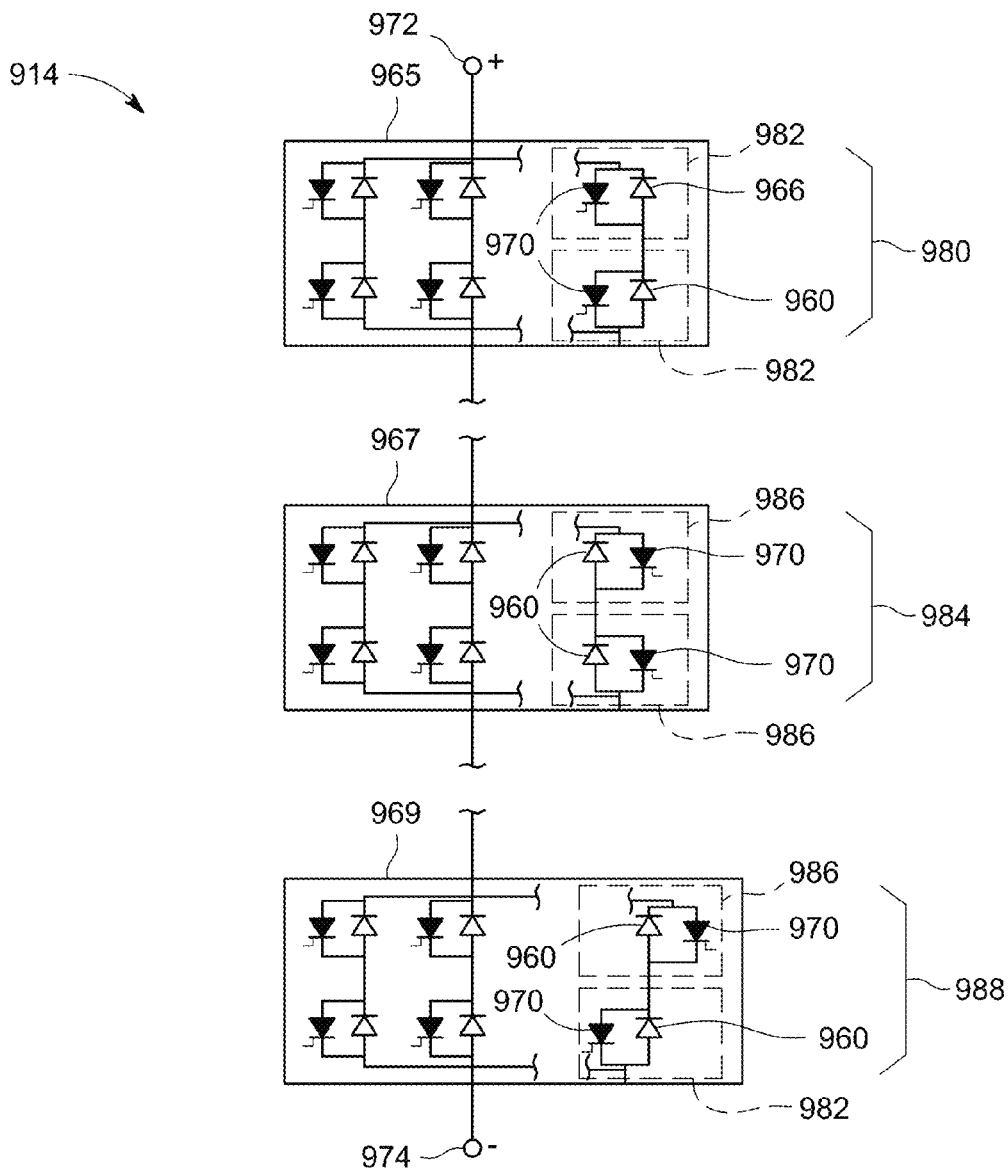
FIG. 9 is a schematic view of a portion of another alternative passive DC/DC rectifier that may be used with the DC power transmission system shown in FIG. 1.

FIG. 9 is a schematic view of a portion of an alternative passive DC/DC rectifier 914 that may be used with DC power transmission system 100 (shown in FIG. 1). DC/DC rectifier 914 includes a plurality of diodes 960. DC/DC rectifier 914 also includes a plurality of modules, i.e., a first module 965, a second module 967, and a third module 969. DC/DC rectifier 914 further includes a plurality of actively-controllable switches 970. Switches 970 are active semiconductor switching devices such as, without limitation, IGBTs and thyristors. Operation of switches 970 are similar to that described above for switches 770 (shown in FIG. 7). DC/DC rectifier 914 may be used as DC/DC rectifiers 214, 314, 414, 514, and 614 (shown in FIGS. 2 through 6, respectively).

Each switch 970 is coupled in parallel with each diode 960 in slightly different configurations within modules 965, 967, and 969. In the exemplary embodiment, modules 965, 967, and 969 are coupled in series between a positive terminal 972 and a negative terminal 974. Alternatively, any configuration of modules 965, 967, and 969 that enables operation of DC/DC rectifier 914 and DC power transmission system 100 as described herein is used. Terminals 972 and 974 are coupled to transmission cables 114 (shown in FIG. 1). Alternatively, terminals 972 and 974 are coupled to any transmission cables in any configuration that enables operation of DC/DC rectifier 914 and DC power transmission system 100 as described herein.

Module 965 includes a diode/switch configuration 980 that includes a plurality of diode/switch submodules 982 (two shown in FIG. 9) coupled in series. Each diode/switch submodule 982 includes a diode 960 and a switch 970 coupled in parallel with each other with switch 970 configured to bypass diode 960. Alternatively, any number of diodes 960 and switches 970 in any combination are used that enables operation of DC/DC rectifier 914, module 965, and DC power transmission system 100 as described herein.

Module 967 includes a diode/switch configuration 984 that includes a plurality of diode/switch submodules 986 (two shown in FIG. 9) coupled in series. Each diode/switch submodule 986 includes a diode 960 and a switch 970 coupled in parallel with each other with switch 970 configured to bypass diode 960. In contrast to submodules 982, diodes 960 and switches 970 are physically exchanged with each other while maintaining similar polarities and orientations. Alternatively, any number of diodes 960 and switches 970 in any combination are used that enables operation of DC/DC rectifier 914, module 967, and DC power transmission system 100 as described herein.

Module 969 includes a diode/switch configuration 988 that includes a combination of diode/switch submodules 982 and 986 (one of each shown in FIG. 9) coupled in series. Alternatively, any number of diodes 960 and switches 970 in any combination are used that enables operation of DC/DC rectifier 914, module 969, and DC power transmission system 100 as described herein.

Figure 10:
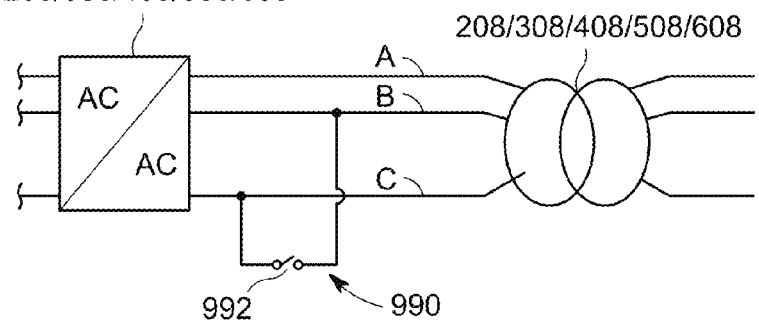
FIG. 10 is a schematic view of a short circuit device that may be used with the DC power transmission system shown in FIG. 1.

FIG. 10 is a schematic view of a short circuit device 990 that may be used with the DC power transmission system 100 (shown in FIG. 1). Short circuit device 990 is positioned between AC/AC converter 202 and step-up transformer 206. Similar configurations are also used for AC/AC converters 302, 402, 502, and 602 and transformers 306, 406, 506, and 606, respectively. Short circuit device 990 includes at least one switch 992 (only one shown in FIG. 10) that is normally open and shown in the open position. Switch 992 is any switching device that enables operation of short circuit device 990 and DC power transmission system 100 as described herein, including, without limitation, a semiconductor switching device and an electro-mechanical switching device. In contrast to short circuit devices that include a plurality of switches configured to couple and short all three of phases A, B, and C, short circuit device 990 includes only one switch 992 that is configured to short only two phases (phases B and C as shown in FIG. 10). Therefore, short circuit device 990 is simpler, smaller, and lighter than three-phase shorting devices.

The embodiments described herein disclose a DC power transmission system that transmits electrical power from an AC electrical source to an electrical load, for example a DC motor. The DC power transmission system includes a transmission end converter that converts the AC power to DC power. Specifically, the transmission end converter described herein includes an AC stage that includes an AC/AC converter and a AC/DC conversion stage that includes an AC/DC rectifier coupled to the AC stage through a transformer that includes primary and secondary windings electromagnetically coupled to each other. As such, the transmission end converter is configured to generate an electric field including at least one field component substantially constant with respect to time and at least one field component that varies with time. The transmission end converter described herein facilitates reducing the number of AC/DC conversion stage components that require high voltage DC insulation with respect to ground. Specifically, the DC power transmission system described herein includes a transmission end converter that facilitates reducing the amount of active components that require high voltage DC insulation.

Moreover, at least some of the components within the transmission end converter described herein have substantially no insulation with respect to the substantially constant components of the electrical field, i.e., they have substantially no DC insulation to ground. More specifically the AC/AC converter and primary windings of the transformer have a reduced amount of total insulation to ground compared to a DC/DC converter operated at the same transmission voltage level. Accordingly, the AC/AC converter and the transformer have a reduced cost in DC insulation and a reduced size footprint compared to known DC/DC converters. Additionally, the active voltage and current control devices are positioned on the AC side of the transmission system while only passive components are positioned on the DC side of the transmission system. Passive components require less insulation than active components, and the transmission end converter may be even smaller and lighter.

Also, the DC power transmission system and the transmission end converter described herein include an AC/AC converter that also controls the frequency of the AC power provided to the AC/DC conversion stage. In one embodiment, the AC/AC converter boosts the frequency to a high frequency, e.g., from 100 Hertz (Hz) to 100 kHz, and more preferably between 100-20 kHz. In such an implementation, the DC transmission system includes a high frequency transformer between the AC stage and the AC/DC conversion stage that passively steps up the voltage of the AC power. The high frequency transformer requires less wire with reduced inductive losses, enabling the high frequency transformer to occupy less space than a standard 50 Hz or 60 Hz transformer.

Further, the transmission end converter of the present disclosure also enables fine control of the transmission voltage by coupling a plurality of power conversion sections in parallel. In one embodiment, the AC stage includes a plurality of parallel AC/AC converters. In another embodiment, the AC stage includes one AC/AC converter and at least one electrical switch operated in parallel. The electrical switch provides large changes in transmission voltage when switched, while the AC/AC converter provides fine control of the transmission voltage. In each embodiment, a portion of the AC stage requires substantially no DC insulation to ground.

Moreover, some embodiments of the transmission end converter described herein facilitate taking portions of the converter out of service while maintaining the majority of the device in service through isolating switches, grounding switches, and diodes that fail to a stable short circuit condition.

An exemplary technical effect of the methods, systems, and apparatus described herein includes at least one of: (a)

reducing the amount of DC insulation to ground used in a transmission end converter; (b) reducing the physical footprint of a transmission end converter; (c) providing fine and coarse control of the transmission voltage of the transmission end converter using an active AC stage; and (d) providing mechanisms to remove a portion of the transmission end converter from service while maintaining the remainder of the converter in service.

Exemplary embodiments of DC transmission systems and transmission end converters are described above in detail. The transmission end converters and methods of operating and manufacturing the same are not limited to the specific embodiments described herein, but rather, components of systems and/or steps of the methods may be utilized independently and separately from other components and/or steps described herein.

Although specific features of various embodiments may be shown in some drawings and not in others, this is for convenience only. Any feature of a drawing may be referenced and/or claimed in combination with any feature of any other drawing.

This written description uses examples to describe the embodiments of the disclosure, including the best mode, and also to enable any person skilled in the art to practice the systems and methods described herein, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A direct current (DC) power transmission system configured to generate a DC electric field component and an alternating current electric field component, said DC power transmission system comprising:
   an alternating current (AC) stage configured to receive AC electrical power, said AC stage comprising:
   a transformer comprising primary windings and secondary windings configured to be electromagnetically coupled to each other and electrically isolated from each other;
   an AC/AC converter having substantially no insulating features against the DC electric field component and being electrically coupled to at least one primary winding of said primary windings;
   an AC/DC conversion stage positioned downstream of said AC stage, said AC/DC conversion stage comprising an AC/DC rectifier configured to convert AC electrical power to DC electrical power without external control, said AC/DC rectifier coupled to at least one secondary winding of said secondary windings;
   wherein said AC/AC converter comprises a plurality of parallel AC/AC converters; and
   wherein said AC/DC rectifier comprises a plurality of series AC/DC rectifiers positioned downstream of said plurality of parallel AC/AC converters.

2. The DC power transmission system in accordance with claim 1, wherein said AC/AC converter and said AC/DC rectifier at least partially form a power conversion section, said power conversion section comprises at least one disabling device configured to selectively disable at least a portion of said power conversion section.

3. The DC power transmission system in accordance with claim 2, wherein said at least one disabling device comprises at least one of:
   a disable switch coupled in series with said at least one AC/AC converter; and
   a grounding switch coupled to said at least one AC/AC converter.

4. The DC power transmission system in accordance with claim 1, wherein said at least one AC/DC conversion stage further comprises a controllable switch that facilitates current transmission from a terminal having a positive polarity to a terminal having a negative polarity.

5. The DC power transmission system in accordance with claim 4, wherein said controllable switch comprises a thyristor.

6. The DC power transmission system in accordance with claim 1, wherein the AC electrical power is transmitted from an AC power grid having an AC power grid frequency, said AC/AC converter is configured to increase the frequency of the AC electrical power from the AC power grid.

7. The DC power transmission system in accordance with claim 1, wherein the AC electrical power is transmitted from an AC power grid having an AC power grid frequency, said transformer is configured to operate with a fundamental frequency that is different from the AC power grid frequency.

8. The DC power transmission system in accordance with claim 1, wherein said AC stage further comprises a switch coupled in parallel with said AC/AC converter, wherein said switch is selectively controlled to at least one of increase and decrease a transmission voltage level of said AC stage.

9. The DC power transmission system in accordance with claim 8, wherein said switch facilitates coarse control of the transmission voltage and said AC/AC converter facilitates fine control of the transmission voltage.

10. The DC power transmission system in accordance with claim 1, wherein said AC/DC conversion stage further comprises a filtering component positioned downstream of said AC/DC rectifier, said filtering component configured to facilitate reducing at least one of DC ripple and AC harmonics on the DC electrical power.

11. The DC power transmission system in accordance with claim 1, wherein said AC/DC rectifier comprises a diode configured to attain a stable short circuit condition.

12. A transmission end converter for a DC transmission system, said transmission end converter configured to generate a DC electric field component and an alternating current electric field component, said transmission end converter comprising:
   an alternating current (AC) stage configured to receive AC electrical power, said AC stage comprising:
   a transformer comprising primary windings and secondary windings configured to be electromagnetically coupled to each other and electrically isolated from each other;
   an AC/AC converter having substantially no insulating features against the DC electric field component and being electrically coupled to at least one primary winding of said primary windings;
   an AC/DC conversion stage positioned downstream of said AC stage, said AC/DC conversion stage comprising a AC/DC rectifier configured to convert AC electrical power to DC electrical power without external control, said AC/DC rectifier coupled to at least one secondary winding of said secondary windings;
   wherein said AC/AC converter comprises a plurality of parallel AC/AC converters; and wherein said AC/DC rectifier comprises a plurality of series AC/DC rectifiers positioned downstream of said plurality of parallel AC/AC converters.

13. The transmission end converter in accordance with claim 12, wherein said AC/AC converter and said AC/DC rectifier at least partially form a power conversion section, said power conversion section comprises a disabling device configured to selectively disable at least a portion of said power conversion section.

14. The transmission end converter in accordance with claim 13, wherein said disabling device comprises at least one of:
a disable switch coupled in series with said AC/AC converter; and
a grounding switch coupled to said AC/AC converter.

15. The transmission end converter in accordance with claim 12, wherein said AC/DC conversion stage further comprises a controllable switch that facilitates current transmission from a terminal having a positive polarity to a terminal having a negative polarity.

16. The transmission end converter in accordance with claim 15, wherein said controllable switch comprises a thyristor.

17. The transmission end converter in accordance with claim 12, wherein the AC electrical power is transmitted from an AC power grid having an AC power grid frequency, said AC/AC converter is configured to increase the frequency of the AC electrical power from the AC power grid.

18. The transmission end converter in accordance with claim 12, wherein the AC electrical power is transmitted from an AC power grid having an AC power grid frequency, said transformer is configured to operate with a fundamental frequency that is different from the AC power grid frequency.

19. The transmission end converter in accordance with claim 12, wherein said AC stage further comprises a switch coupled in parallel with said AC/AC converter, wherein said switch is selectively controlled to at least one of increase and decrease a transmission voltage level of said AC stage.

20. The transmission end converter in accordance with claim 19, wherein said switch facilitates coarse control of the transmission voltage and said AC/AC converter facilitates fine control of the transmission voltage.

21. The transmission end converter in accordance with claim 12, wherein said AC/DC conversion stage further comprises a filtering component positioned downstream of said AC/DC rectifier, said filtering component configured to facilitate reducing at least one of DC ripple and AC harmonics on the DC electrical power.

22. The transmission end converter in accordance with claim 12, wherein said AC/DC rectifier comprises a diode configured to attain a stable short circuit condition.

23. A method of assembling a transmission end converter configured to receive alternating current (AC) electrical power and convert the AC electrical power to direct current (DC) electrical power, the transmission end converter also configured to generate a DC electric field component and an alternating current electric field component, said method comprising:
electrically coupling an AC/AC converter to at least one primary winding of a plurality of primary windings of a transformer, thereby at least partially forming an AC stage, wherein the AC/AC converter and the primary windings have substantially no insulating features against the DC electric field component of the electric field;
Electromagnetically coupling secondary windings of the transformer to the primary windings;
electrically coupling a AC/DC rectifier to at least one secondary winding of the secondary windings, thereby at least partially forming an AC/DC conversion stage, wherein the AC/DC rectifier is positioned downstream of the transformer;
wherein said AC/AC converter comprises a plurality of parallel AC/AC converters; and
wherein said AC/DC rectifier comprises a plurality of series AC/DC rectifiers positioned downstream of said plurality of parallel AC/AC converters.

* * * * *